(12) United States Patent
Lee et al.

(10) Patent No.: US 7,762,708 B2
(45) Date of Patent: Jul. 27, 2010

(54) BACKLIGHT ASSEMBLY, DISPLAY APPARATUS HAVING THE SAME AND METHOD OF ASSEMBLING THE SAME

(75) Inventors: Jeoung-Gwen Lee, Suwon-si (KR); Sang-Ik Han, Asan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/407,670

(22) Filed: Mar. 19, 2009

(65) Prior Publication Data

US 2010/0067218 A1 Mar. 18, 2010

(51) Int. Cl.
  *F21V 33/00* (2006.01)
(52) U.S. Cl. ...................................... 362/632; 362/634
(58) Field of Classification Search ................. 362/632, 362/633, 634
  See application file for complete search history.

(56) References Cited

U.S. PATENT DOCUMENTS

2004/0240195 A1* 12/2004 Tsai ............................ 362/31
2007/0165420 A1* 7/2007 Weng et al. ................. 362/609

FOREIGN PATENT DOCUMENTS

| KR | 10-2001-0017691 | 3/2001 |
| KR | 10-2005-0030379 | 3/2005 |
| KR | 10-2007-0088117 | 8/2007 |

OTHER PUBLICATIONS

English Abstract, Publication No. KR 10-2001-0017691.
English Abstract, Publication No. KR 10-2005-0030379.
English Abstract, Publication No. KR 10-2007-0088117.

* cited by examiner

*Primary Examiner*—Laura Tso
(74) *Attorney, Agent, or Firm*—Innovation Counsel LLP

(57) ABSTRACT

A backlight assembly, a display apparatus having the backlight assembly, and a method of assembling the backlight assembly are disclosed for embodiments. For example, a backlight assembly may include a receiving container which includes a first receiving member that receives a lamp and a portion of a light guide plate and a second receiving member that receives a remaining portion of the light guide plate. A reflection sheet is disposed between the light guide plate and the receiving container and elongated to cover the lamp. An adhesive is disposed between the reflection sheet and the receiving container and includes a heat-bondable material to adhere the reflection sheet to the receiving container when heat is applied thereto. Accordingly, the reflection sheet may be prevented from being wrinkled due to heat generated from the lamp, thereby enhancing assemblability of the backlight assembly.

22 Claims, 7 Drawing Sheets

BACKLIGHT ASSEMBLY, DISPLAY APPARATUS HAVING THE SAME AND METHOD OF ASSEMBLING THE SAME

CROSS-REFERENCE TO RELATED APPLICATION

This application claims priority to and benefit of Korean Patent Application No. 2008-91693, filed Sep. 18, 2008, the contents of which are herein incorporated by reference in its entirety.

BACKGROUND

1. Technical Field

The present invention relates generally to a backlight assembly, a display apparatus having the same, and a method of assembling the same. More particularly, the present invention relates to a backlight assembly, which for example may be capable of preventing a sheet from being wrinkled, a display apparatus having the backlight assembly, and a method of assembling the backlight assembly.

2. Related Art

In general, a backlight assembly for a display apparatus is classified as a direct illumination type backlight assembly or an edge illumination type backlight assembly according to positions of light sources.

The direct illumination type backlight assembly includes a plurality of lamps arranged under a display panel to directly supply light to the display panel. The edge illumination type backlight assembly includes a plurality of lamps arranged adjacent to a side surface of a light guide plate that is arranged under the display panel. In the edge illumination type backlight assembly, the light emitted from the lamps is guided to the display panel through the light guide plate.

Further, the edge illumination type backlight assembly includes a mold frame that receives the light guide plate, the lamps and optical sheets, and a back cover that covers a rear face of the mold frame. The lamps are received in a lamp reflector and arranged on a side wall of the mold frame, and an end of the light guide plate, which is adjacent to the lamps, is inserted into the lamp reflector.

As described above, the edge illumination type backlight assembly typically requires many parts for assembling the lamps to inhibit the discharge of heat generated from the lamps to an exterior. Accordingly, the many parts for the lamps results in an increase in weight and thickness of the edge illumination type backlight assembly.

SUMMARY

An exemplary embodiment of the present invention provides a backlight assembly, which for example may be capable of preventing the occurrence of wrinkles in sheets and may have a reduced weight and volume.

Another exemplary embodiment of the present invention provides a display apparatus employing the backlight assembly.

Another exemplary embodiment of the present invention provides a method of assembling the backlight assembly.

In an exemplary embodiment of the present invention, a backlight assembly includes at least one first lamp generating a light, a light guide plate, a receiving container, a reflection sheet, and an adhesive. The light guide plate receives the light through a first side surface thereof, which is adjacent to the first lamp, and outputs the light through an exiting surface thereof. The receiving container includes a first receiving member that receives the first lamp and a first portion of the light guide plate with the first side surface, and a second receiving member that receives a second portion of the light guide plate but does not receive the first portion. The first and second receiving members are combined with each other to form the receiving container.

The reflection sheet is disposed between the light guide plate and the receiving container and elongated to cover the first lamp such that the reflection sheet reflects the light leaked from the light guide plate and the light emitted from the first lamp to the light guide plate. The adhesive is disposed between the reflection sheet and the receiving container and includes a heat-bondable material to adhere the reflection sheet to the receiving container.

In another exemplary embodiment of the present invention, a display apparatus includes at least one first lamp generating a light, a light guide plate, a receiving container, a reflection sheet, an adhesive, a frame, and a display unit.

The light guide plate receives the light through a first side surface thereof, which is adjacent to the first lamp, and outputs the light through an exiting surface thereof. The receiving container includes a first receiving member that receives the first lamp and a first portion of the light guide plate with the first side surface, and a second receiving member that receives a second portion of the light guide plate but does not receive the first portion. The first and second receiving members are combined with each other to form the receiving container.

The reflection sheet is disposed between the light guide plate and the receiving container and elongated to cover the first lamp such that the reflection sheet reflects the light leaked from the light guide plate and the light emitted from the first lamp to the light guide plate. The adhesive is disposed between the reflection sheet and the receiving container and includes a heat-bondable material to adhere the reflection sheet to the receiving container.

The frame is combined with the receiving container to expose the exiting surface of the light guide plate therethrough while facing the receiving container. The display unit is disposed on the frame to display an image using the light exiting from the exiting surface of the light guide plate.

In another exemplary embodiment of the present invention, a method of assembling a backlight assembly is provided as follows. An adhesive is coated on a lower surface of first and second reflection sheets, and first and second receiving members are combined with each other to complete a receiving container. Then, the first and second reflection sheets are disposed on inner surfaces of the first and second receiving members, respectively, and at least one lamp and a light guide plate are received into the receiving container. The lamp generates a light, and the light guide plate receives the light through a side surface thereof and outputs the light through an exiting surface thereof. Next, when a heat is applied to the adhesive to melt the adhesive, the first and second reflection sheets are adhered to the inner surfaces of the first and second receiving members, respectively.

According to the above, the receiving container is divided into the first and second receiving members each of which serves as a lamp reflector covering the lamps. The refection sheets are fixedly adhered to the receiving container by the adhesive. Accordingly, the reflection sheets may be prevented from being wrinkled by heat generated from the lamps, assemblability of the backlight assembly may be enhanced, and the light leakage of the backlight assembly may be prevented, thereby enhancing brightness of the backlight assembly.

BRIEF DESCRIPTION OF THE DRAWINGS

The above and other advantages of the present invention will become more readily apparent by reference to the following detailed description when considered in conjunction with the accompanying drawings wherein.

DETAILED DESCRIPTION

Figure 1:
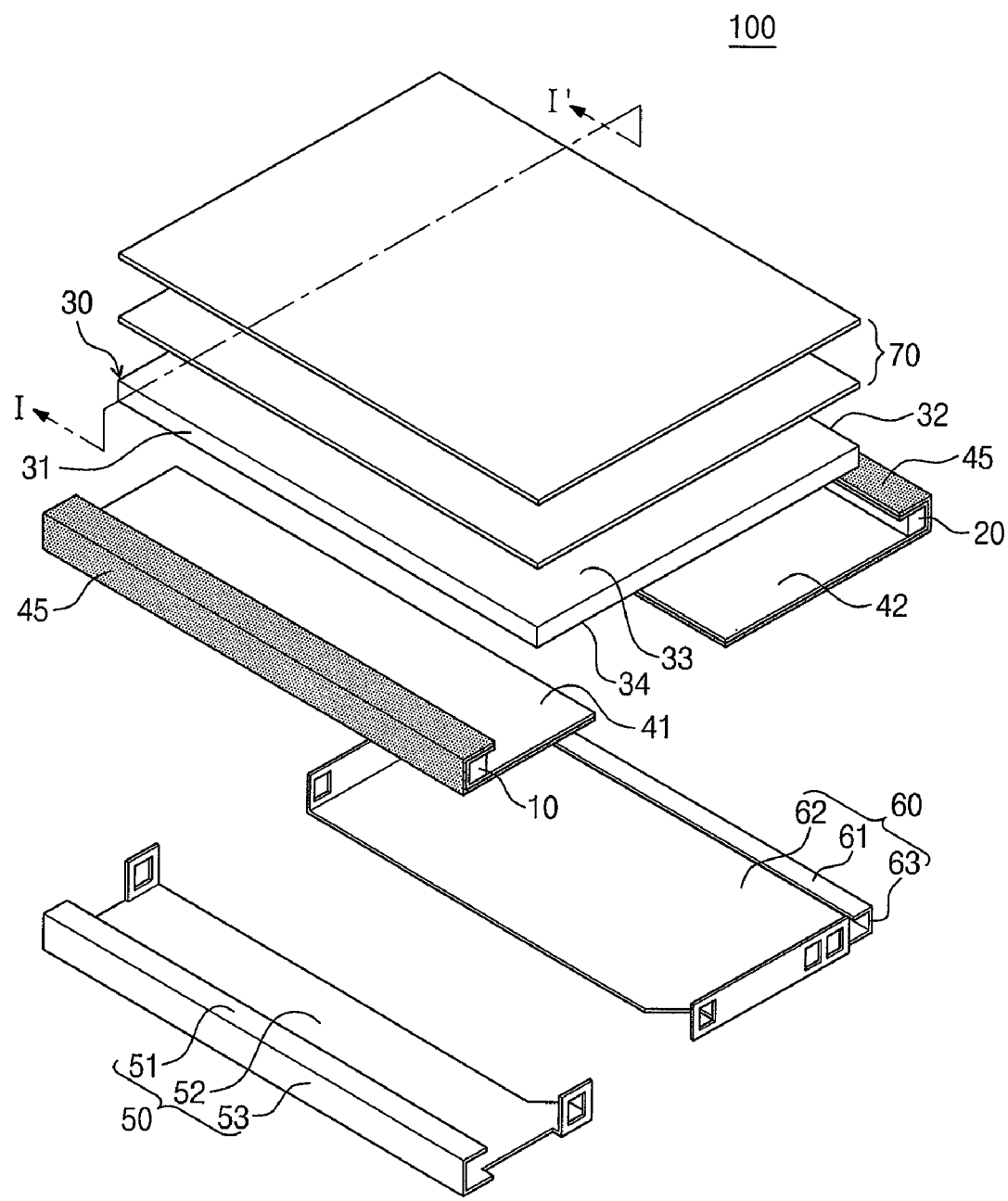
FIG. 1 is an exploded perspective view showing a backlight assembly according to an exemplary embodiment the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 2:
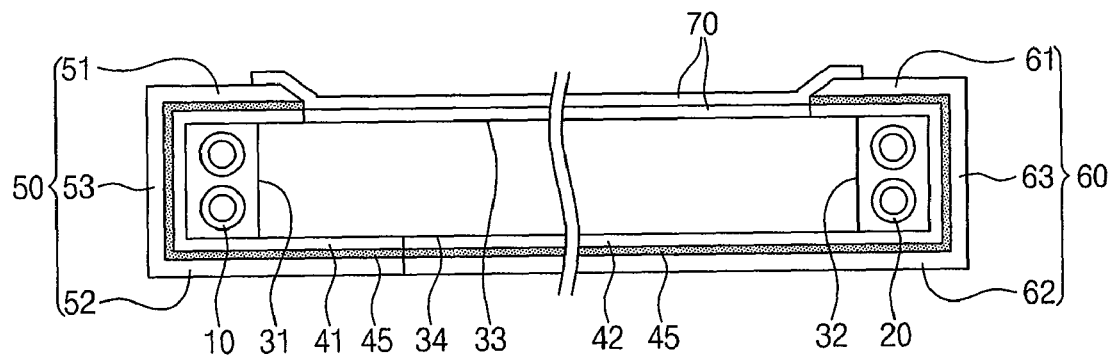
FIG. 2 is a sectional view taken along a line I-I' of FIG. 1, in accordance with an embodiment.

FIG. 1 is an exploded perspective view showing a backlight assembly according to an exemplary embodiment the present invention, and FIG. 2 is a sectional view taken along a line I-I' of FIG. 1, according to an exemplary embodiment. Referring to FIGS. 1 and 2, a backlight assembly 100 includes at least one first lamp 10, at least one second lamp 20, a light guide plate 30, first and second reflection sheets 41 and 42, and first and second receiving members 50 and 60.

The first and second lamps 10 and 20 include a cold cathode fluorescent lamp to emit light. The light guide plate 30 has a rectangular plate-like shape and a uniform thickness and includes a first side surface 31 adjacent to the first lamp 10 and a second side surface 32 adjacent to the second lamp 20. The light guide plate 30 includes an exiting surface 33 from which the light incident through the first and second side surfaces 31 and 32 exits and a reflecting surface 34 by which the incident light is reflected toward the exiting surface 33.

The light guide plate 30 includes a light-scattering and light-guiding material that has a light transmittance, a thermal resistance, a chemical resistance, and a high strength. In one example, the light-scattering and light-guiding material may include resins, such as polymethyl methacrylate, polyamide, polyimide, polypropylene, polyurethane, etc.

The first and second receiving members 50 and 60 are combined with each other to serve as a receiving container. The first receiving member 50 receives the first lamp 10 and a portion of light guide plate 30, in which the first side surface 31 is positioned, and the second receiving member 60 receives the second lamp 20 and a remaining portion of the light guide plate 30, in which the second side surface 32 is positioned.

Particularly, the first receiving member 50 includes a first upper plate 51, a first lower plate 52, and a first side plate 53. The first upper plate 51 covers an upper portion of the first lamp 10 and overlaps a portion of the exiting surface 33 of the light guide plate 30 at an end of the light guide plate 30. The first lower plate 52 is disposed parallel with the first upper plate 51, covers a lower portion of the first lamp 10, and overlaps a portion of the reflecting surface 34 at the end of the light guide plate 30. The first side plate 53 covers a side portion of the first lamp 10 to connect the first upper plate 51 with the first lower plate 52.

The second receiving member 60 includes a second upper plate 61, a second lower plate 62, and a second side plate 63. The second upper plate 61 covers an upper portion of the second lamp 20 and overlaps a portion of the exiting surface 33 of the light guide plate 30 at an opposite end of the light guide plate 30. The second lower plate 62 is disposed parallel with the second upper plate 61, covers a lower portion of the second lamp 20, and overlaps a remaining portion of the reflecting surface 34. The second side plate 63 covers a side portion of the second lamp 20 to connect the second upper plate 61 with the second lower plate 62. In one example embodiment, the first and second receiving members 50 and 60 may include a metallic material, such as aluminum, SECC, or SGLCC.

The first reflection sheet 41 is arranged on an entire inner surface of the first receiving member 50, and the second reflection sheet 42 is arranged on an entire inner surface of the second receiving member 60. Accordingly, the first and second reflection sheets 41 and 42 may reflect the light leaked from the reflecting surface 34 of the light guide plate 30 to the exiting surface 33 of the light guide plate 30. In one aspect, since the first and second reflection sheets 41 and 42 are arranged on the entire inner surfaces of the first and second receiving members 50 and 60, respectively, the first and second reflection sheets 41 and 42 may reflect the light emitted from the first and second lamps 10 and 20 to the first and second side surfaces 31 and 32 of the light guide plate 30, respectively.

An adhesive 45 is disposed between the first reflection sheet 41 and the inner surface of the first receiving member 50 and between the second reflection sheet 42 and the inner surface of the second receiving member 60. The adhesive 45 includes a heat-bondable material. Thus, in one aspect, the adhesive 45 does not have adhesivity under a constant temperature, but the adhesive 45 is melted when heat is applied thereto, thereby adhering the first and second reflection sheets 41 and 42 to the first and second receiving members 50 and 60, respectively. In the present exemplary embodiment, the adhesive 45 may include various adhesives having heat bondability, such as amide-containing adhesive compositions, ethylene-vinylacetate copolymer-containing adhesives, polyisobutylene-containing adhesives, or the like.

When the first and second reflection sheets 41 and 42 are fixedly adhered to the first and second receiving members 50 and 60 due to the adhesive 45 melted by the heat, the first and second reflection sheets 41 and 42 may be prevented from being wrinkled by the heat from the first and second lamps 10 and 20.

In one aspect, since the first and second reflection sheets 41 and 42 are fixedly adhered to the first and second receiving members 50 and 60, assemblability of the backlight assembly 100 is enhanced, and light leakage of the backlight assembly 100 is prevented, thereby enhancing brightness of the backlight assembly 100 by, for example, 4 to 5 percent.

The backlight assembly 100 may include an optical sheet 70. The optical sheet 70 is disposed on the exiting surface 31 of the light guide plate 30 to improve brightness uniformity and front brightness of the light exiting from the exiting surface 31 of the light guide plate 30.

Figure 3A:
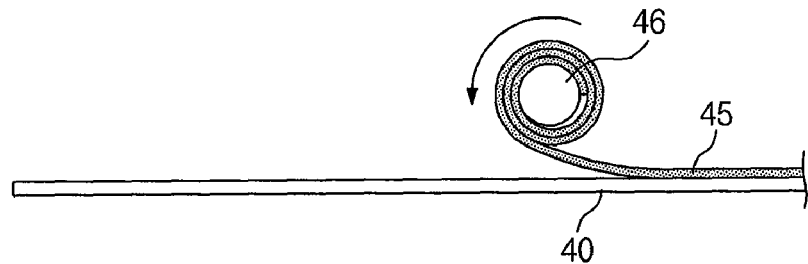
FIGS. 3A to 3E are views showing an assembling process of a backlight assembly of FIG. 2, in accordance with an embodiment.

FIGS. 3A to 3E are views showing an assembly process of a backlight assembly of FIG. 2, in accordance with an embodiment. Referring to FIG. 3A, a roller 46 to which the heat-bondable adhesive 45 is attached is disposed on a base film 40 used as the first and second reflection sheets 41 and 42. Then, the roller 46 is rotated along the base film 40 to coat the heat-bondable adhesive 45 over the base film 40.

Figure 3B:
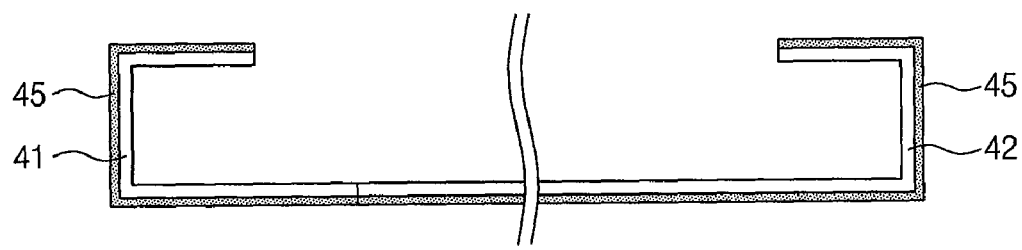

As shown in FIG. 3B, the base film 40 is processed to form the first and second reflection sheets 41 and 42 having the same shape as the first and second receiving members 50 and 60, respectively. Thus, in one aspect, the heat-bondable adhesive 45 is coated on an outer surface of the first and second reflection sheets 41 and 42.

Figure 3C:
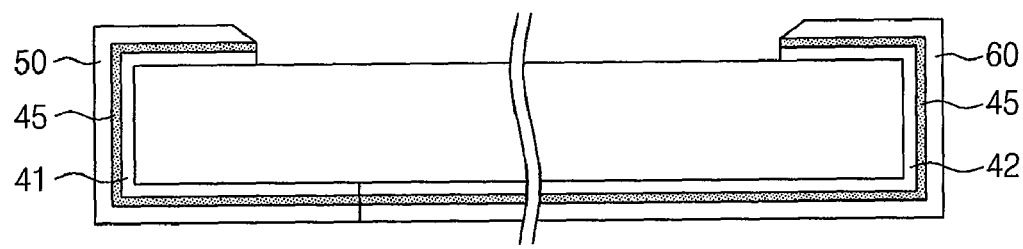

Next, referring to FIG. 3C, the first and second receiving members 50 and 60 are combined with each other to complete the receiving container, and the first and second reflection sheets 41 and 42 are disposed on the inner surface of the first and second receiving members 50 and 60, respectively. In one aspect, since the heat-bondable adhesive 45 may not adhere, the first and second reflection sheets 41 and 42 may not be fixed to the first and second receiving members 50 and 60.

Figure 3D:
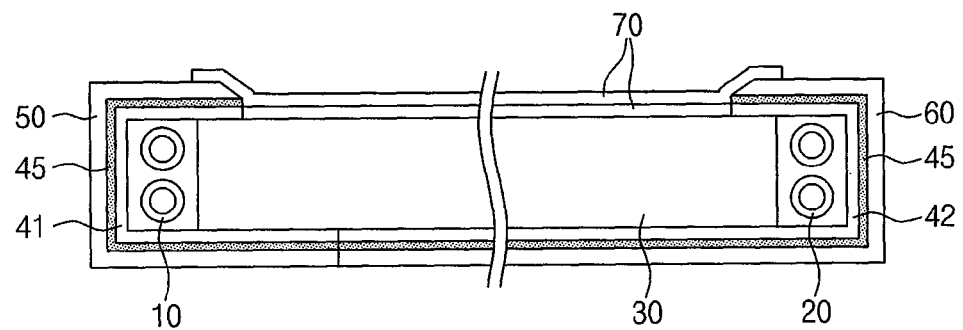

As shown in FIG. 3D, the first and second lamps 10 and 20, the light guide plate 30, and the optical sheet 70 are received into the receiving container constituted by the first and second receiving members 50 and 60 to assemble the backlight assembly 100.

Figure 3E:
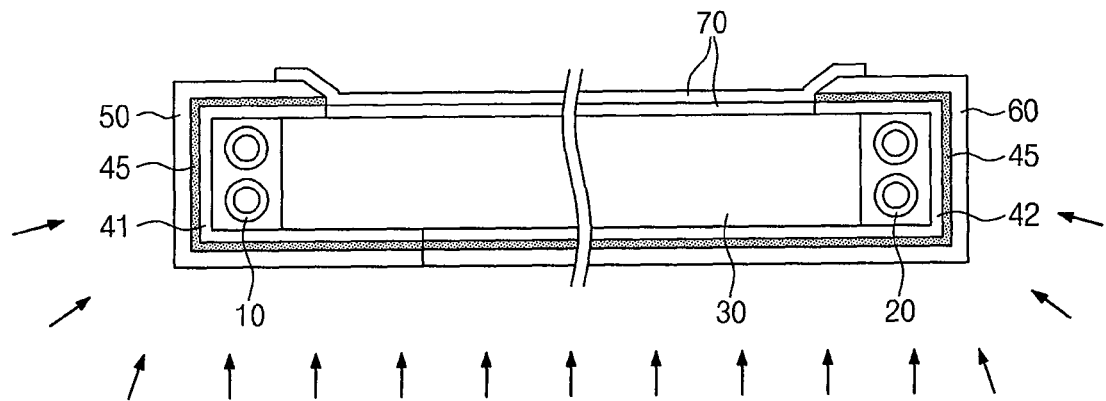

Referring to FIG. 3E, the heat is applied to the backlight assembly 100 to melt the heat-bondable adhesive 45, thereby adhering the first and second receiving members 50 and 60 to the first and second reflection sheets 41 and 42, respectively.

Although the additional process that applies the heat to the backlight assembly 100 is not performed to melt the heat-bondable adhesive 45, the heat-bondable adhesive 45 may be melted by heat generated while the backlight assembly 100 is aged under a high temperature, so that the first and second reflection sheets 41 and 42 may be adhered to the first and second receiving members 50 and 60, respectively.

Although not shown in FIGS. 3A to 3E, after the first and second reflection sheets 41 and 42 are disposed on the inner surface of the first and second receiving members 50 and 60, the process that applies the heat to the first and second reflection sheets 41 and 42 may be further performed before the first and second lamps 10 and 20, the light guide plate 30, and the optical sheet 70 are received into the first and second receiving members 50 and 60. Accordingly, the first and second lamps 10 and 20, the light guide plate 30, and the optical sheet 70 may be received into the first and second receiving members 50 and 60 while the first and second reflection sheets 41 and 42 are adhered to the first and second receiving members 50 and 60, respectively.

As described above, when the first and second reflection sheets 41 and 42 are fixedly adhered to the first and second receiving members 50 and 60 by the heat-bondable adhesive 45, the first and second reflection sheets 41 and 42 may be prevented from being wrinkled by the heat generated from the first and second lamps 10 and 20.

In one aspect, since the first and second reflection sheets 41 and 42 are fixedly adhered to the first and second receiving members 50 and 60, respectively, assemblability of the backlight assembly 100 is enhanced and light leakage of the backlight assembly 100 is prevented, thereby enhancing brightness of the backlight assembly 100 by, for example, 4 to 5 percent.

Figure 4:
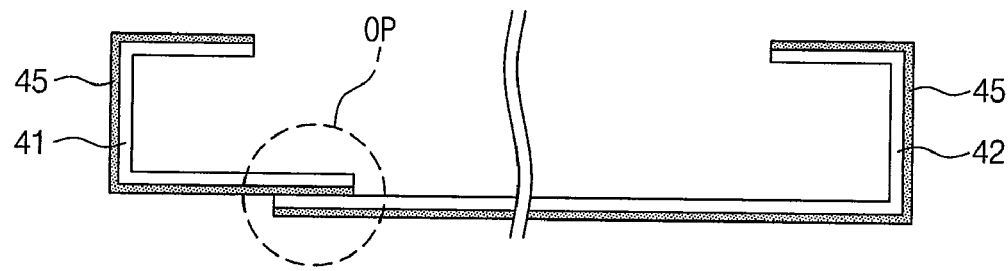
FIG. 4 is a sectional view showing a first reflection sheet, a second reflection sheet, and a receiving container according to another exemplary embodiment of the present invention.

FIG. 4 is a sectional view showing a first reflection sheet, a second reflection sheet, and a receiving container according to another exemplary embodiment of the present invention. Referring to FIG. 4, the first and second reflection sheets 41 and 42 may be received into the receiving container constituted by the first and second receiving members 50 and 60 such that the first and second reflection sheets are overlapped with each other. In one aspect, the heat-bondable adhesive 45 is provided to the portion OP in which the first and second reflection sheets 41 and 42 are overlapped with each other. Thus, after the heat-treatment process, the first and second reflection sheets 41 and 42 are adhered to each other by the heat-bondable adhesive, thereby preventing the light leakage and malfunctioning during the assembly of the backlight assembly 100.

Figure 5:
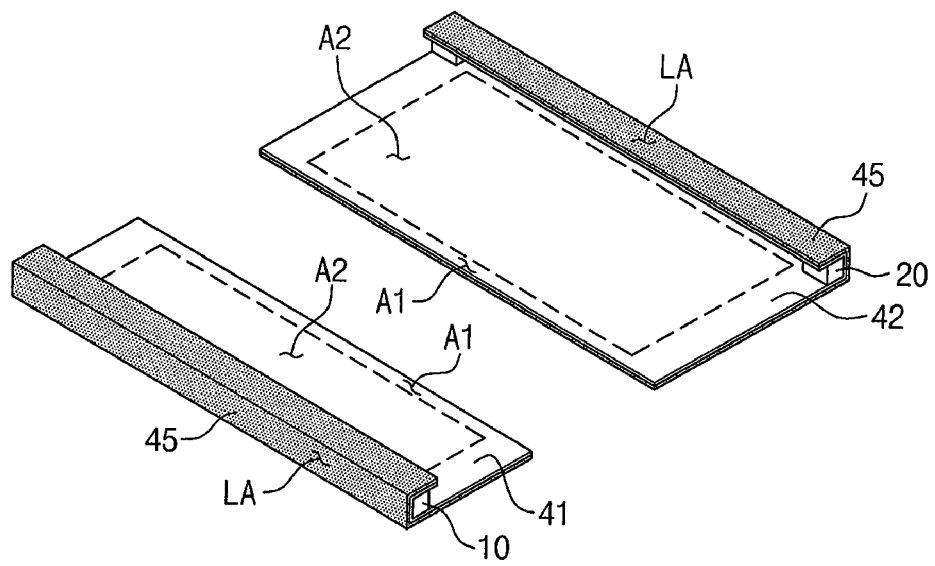
FIG. 5 is a perspective view showing a heat-bondable adhesive, a first reflection sheet, and a second reflection sheet according to another exemplary embodiment of the present invention.

FIG. 5 is a perspective view showing a heat-bondable adhesive, a first reflection sheet, and a second reflection sheet according to another exemplary embodiment of the present invention. Referring to FIG. 5, each of the first and second reflection sheets 41 and 42 is divided into a first area A1 in which the heat-bondable adhesive 45 is formed and a second area A2 in which the heat-bondable adhesive 45 is not formed.

In the present exemplary embodiment, the first area A1 may be an end portion of each of the first and second reflection sheets 41 and 42. As described above, the heat-bondable adhesive 45 may be partially formed on the first and second reflection sheets 41 and 42 to adhere the first and second reflection sheets 41 and 42 to the first and second receiving members 50 and 60, respectively.

In one aspect, the first area A1 may include a lamp cover area LA of each of the first and second reflection sheets 41 and 42, which respectively covers the first and second lamps 10 and 20. In this case, since the first and second reflection sheets 41 and 42 are fixedly adhered to the first and second receiving members 50 and 60, respectively, by the heat-bondable adhesive 45, the first and second reflection sheets 41 and 42 may be prevented from being wrinkled due to the heat generated from the first and second lamps 10 and 20.

Figure 6:
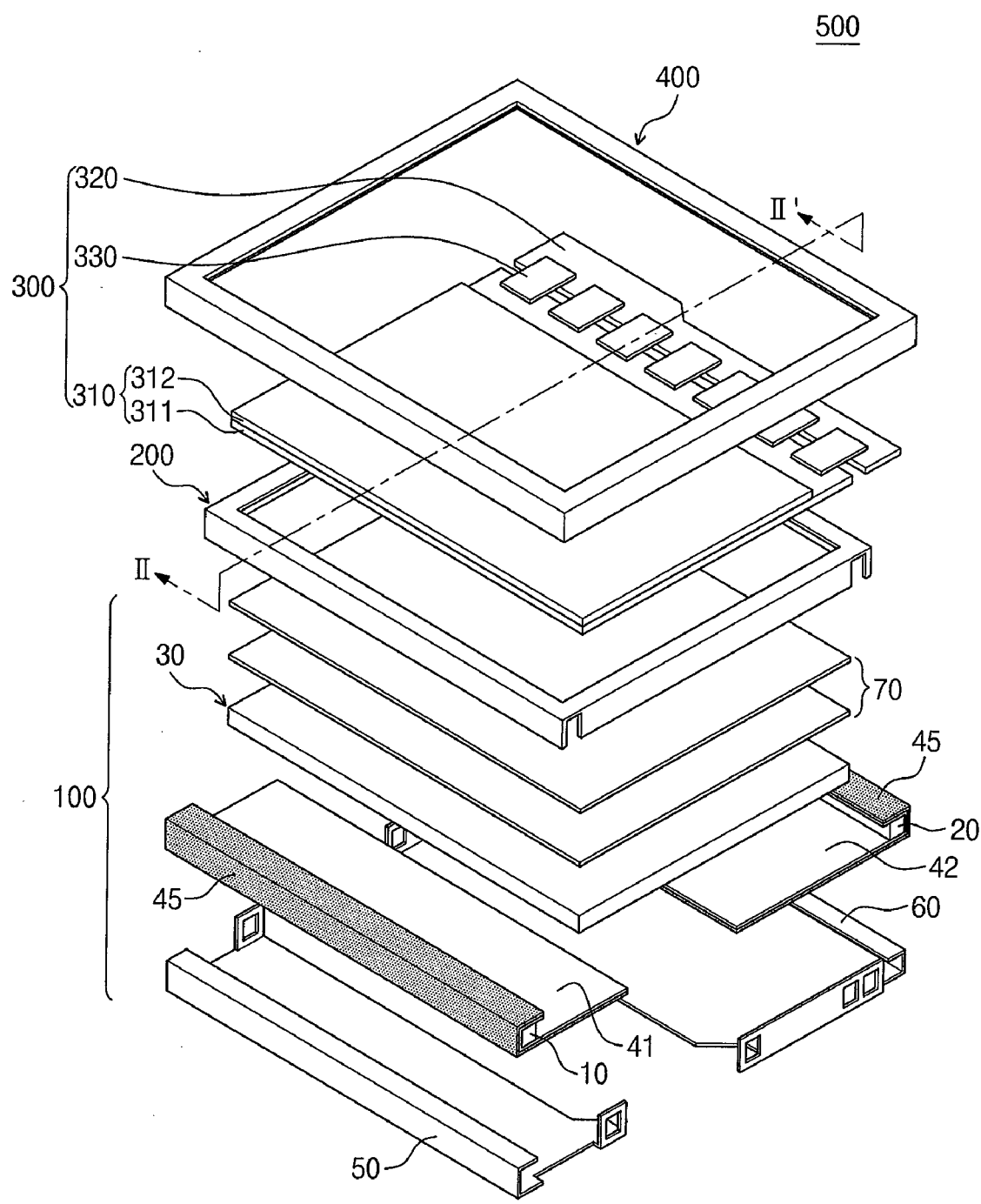
FIG. 6 is an exploded perspective view showing a display apparatus according to an exemplary embodiment of the present invention.
Figure 7:
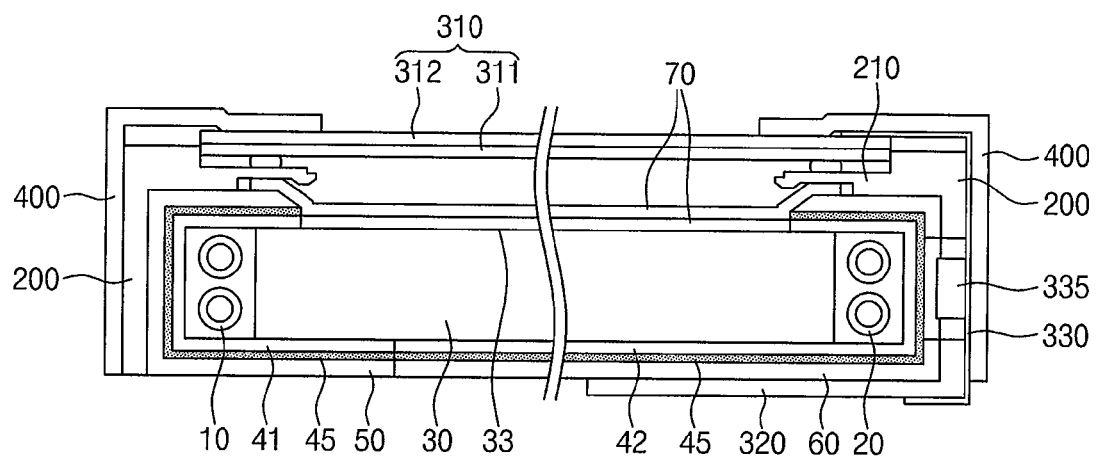
FIG. 7 is a sectional view taken along a line II-II' of FIG. 6, in accordance with an embodiment.

FIG. 6 is an exploded perspective view showing a display apparatus according to an exemplary embodiment of the present invention, and FIG. 7 is a sectional view taken along a line II-II' of FIG. 6, in accordance with an embodiment. In FIGS. 6 and 7, a backlight assembly 100 includes basically the same structure and function as those of the backlight assembly 100 shown in FIGS. 1 and 2. Thus, in FIGS. 6 and 7, the same reference numerals denote the same elements in FIGS. 1 and 2, and detailed descriptions of the same elements will be omitted.

Referring to FIGS. 6 and 7, a display apparatus 500 includes a backlight assembly 100, a frame 200, a display unit 300, and a top chassis 400. The frame 200 is combined with the first and second receiving members 50 and 60 such that the exiting surface 33 of the light guide plate 30 is exposed through the frame 200. The frame 200 is provided with steps in its side walls to receive the display unit 300 thereon. The display unit 300 is disposed on the steps of the frame 200 and includes a display panel 310 that displays images using light from the backlight assembly 100.

The display panel 310 includes an array substrate 311, a color filter substrate 312 facing the array substrate 311, and a liquid crystal layer (not shown) disposed between the array substrate 311 and the color filter substrate 312. The array substrate 311 includes a plurality of pixels arranged in a matrix form, and each pixel includes a pixel electrode. The color filter substrate 312 includes color filters corresponding to the pixel electrodes and a common electrode. When an electric field is generated between the pixel electrodes and the common electrode, alignments of liquid crystal molecules of the liquid crystal layer are varied according to variations of the electric field. Therefore, the light transmittance of the liquid crystal layer is varied and each pixel displays corresponding gray scale, so that the display panel 310 may display required images.

The display unit 300 may further include a printed circuit board 320 and a flexible printed circuit board 330. The printed circuit board 320 applies driving signals to the display panel 310 to generate the electric field. The printed circuit board 320 may be arranged on a rear surface of the second receiving member 60. The flexible printed circuit board 330 is bent outwardly along the sidewall of the frame 200 to electrically connect the array substrate 311 to the printed circuit board 320. The flexible printed circuit board 330 includes driving chips 335 mounted thereon. The frame 200 may be provided with openings to avoid interference with the driving chips 335. The top chassis 400 is partially opened to expose a display screen of the display panel 310 and combined with the first and second receiving members 50 and 60 or the frame 200.

In one aspect, according to the above description, the receiving container is divided into the first and second receiving members each of which serves as a lamp reflector covering the lamps. The refection sheets are fixedly adhered to the receiving container by the adhesive. Thus, the reflection sheets may be prevented from being wrinkled by heat from the lamps, assemblability of the backlight assembly may be enhanced, and the light leakage of the backlight assembly may be prevented, thereby enhancing brightness of the backlight assembly.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   at least a first lamp generating light;
   a light guide plate receiving the light through a first side surface thereof, which is adjacent to the first lamp, to output the light through an exiting surface thereof;
   a receiving container including a first receiving member that receives the first lamp and a first portion of the light guide plate with the first side surface, and a second receiving member that receives a second portion of the light guide plate but does not receive the first portion, wherein the first and second receiving members are combined with each other to form the receiving container;
   a reflection sheet disposed between the light guide plate and the receiving container and elongated to cover the first lamp such that the reflection sheet reflects the light leaked from the light guide plate and the light emitted from the first lamp to the light guide plate; and
   an adhesive disposed between the reflection sheet and the receiving container and including a heat-bondable material to adhere the reflection sheet to the receiving container.

2. The backlight assembly of claim 1, wherein the heat-bondable material has adhesivity above a temperature of about 50 Celsius degrees.

3. The backlight assembly of claim 1, further comprising at least a second lamp disposed adjacent to the second side surface of the light guide plate, and wherein the second receiving member receives the second lamp and the second portion of the light guide plate.

4. The backlight assembly of claim 3, wherein the first receiving member comprises:
   a first upper plate that covers an upper portion of the first lamp and overlaps a portion of the exiting surface adjacent to the first side surface of the light guide plate;
   a first lower plate that covers a lower portion of the first lamp and overlaps a portion of a reflecting surface of the light guide plate, which faces the exiting surface, the first lower plate being parallel with the first upper plate; and a first side plate that covers a side portion of the first lamp and connects the first upper plate with the first lower plate.

5. The backlight assembly of claim 4, wherein the second receiving member comprises:
a second upper plate that covers an upper portion of the second lamp and overlaps a portion of the exiting surface adjacent to the second side surface of the light guide plate;
a second lower plate that covers a lower portion of the first lamp and overlaps a remaining portion of the reflecting surface of the light guide plate, the second lower plate being parallel with the second upper plate; and
a second side plate that covers a side portion of the second lamp and connects the second upper plate with the second lower plate.

6. The backlight assembly of claim 1, wherein the reflection sheet comprises:
a first reflection sheet adhered to an inner surface of the first receiving member by the adhesive; and
a second reflection sheet adhered to an inner surface of the second receiving member by the adhesive.

7. The backlight assembly of claim 6, wherein an end portion of the first reflection sheet overlaps an end portion of the second reflection sheet, and the adhesive is further provided to the overlap portion between the first and second reflection sheets to adhere the first and second reflection sheets to each other.

8. The backlight assembly of claim 6, wherein the first reflection sheet is divided into a first area in which the adhesive is formed and a second area in which the adhesive is not formed and the first area comprises an edge portion of the first reflection sheet, and the second reflection sheet is divided into a first area in which the adhesive is formed and a second area in which the adhesive is not formed and the first area of the second reflection sheet comprises an edge portion of the second reflection sheet.

9. The backlight assembly of claim 8, wherein the first area of the first reflection sheet comprises a lamp cover area of the first reflection sheet to cover the first lamp, and the first area of the second reflection sheet comprises a lamp cover area of the second reflection sheet to cover the second lamp.

10. A display apparatus comprising:
at least a first lamp generating light;
a light guide plate receiving the light through a first side surface thereof, which is adjacent to the first lamp, to output the light through an exiting surface thereof;
a receiving container including a first receiving member that receives the first lamp and a first portion of the light guide plate with the first side surface, and a second receiving member that receives a second portion of the light guide plate but does not receive the first portion, wherein the first and second receiving members are combined with each other to form the receiving container;
a reflection sheet disposed between the light guide plate and the receiving container and elongated to cover the first lamp such that the reflection sheet reflects the light leaked from the light guide plate and the light emitted from the first lamp to the light guide plate;
an adhesive disposed between the reflection sheet and the receiving container and including a heat-bondable material to adhere the reflection sheet to the receiving container;
a frame combined with the receiving container to expose the exiting surface of the light guide plate therethrough while facing the receiving container; and
a display unit disposed on the frame to display an image using the light exiting from the exiting surface of the light guide plate.

11. The display apparatus of claim 10, wherein the heat-bondable material has adhesivity above a temperature of about 50 Celsius degrees.

12. The display apparatus of claim 10, further comprising at least a second lamp disposed adjacent to the second side surface of the light guide plate, and wherein the second receiving member receives the second lamp and the second portion of the light guide plate.

13. The display apparatus of claim 10, wherein the reflection sheet comprises:
a first reflection sheet adhered to an inner surface of the first receiving member by the adhesive; and
a second reflection sheet adhered to an inner surface of the second receiving member by the adhesive.

14. The display apparatus of claim 13, wherein an end portion of the first reflection sheet overlaps an end portion of the second reflection sheet, and the adhesive is further provided to the overlap portion between the first and second reflection sheets to adhere the first and second reflection sheets to each other.

15. The display apparatus of claim 13, wherein the first reflection sheet is divided into a first area in which the adhesive is formed and a second area in which the adhesive is not formed and the first area comprises an edge portion and a lamp cover area of the first reflection sheet to cover the first lamp, and the second reflection sheet is divided into a first area in which the adhesive is formed and a second area in which the adhesive is not formed and the first area of the second reflection sheet comprises an edge portion and a lamp cover area of the second reflection sheet to cover the second lamp.

16. The display apparatus of claim 10, further comprising an optical sheet disposed on the exiting surface of the light guide plate to improve a brightness characteristic of the light exiting through the exiting surface of the light guide plate, the optical sheet being fixed to the receiving container by the frame.

17. The display apparatus of claim 10, further comprising a top chassis combined with the frame while exposing an upper surface of the display unit therethrough to fix the display unit to the frame.

18. A method of assembling a backlight assembly, comprising:
coating an adhesive on a lower surface of first and second reflection sheets;
combining first and second receiving members with each other to complete a receiving container;
disposing the first and second reflection sheets on inner surfaces of the first and second receiving members, respectively;
disposing at least a lamp and a light guide plate into the receiving container, the lamp generating light, and the light guide plate receiving the light through a side surface thereof and outputting the light through an exiting surface thereof; and
applying heat to the adhesive to adhere the first and second reflection sheets to the inner surfaces of the first and second receiving members, respectively.

19. The method of claim 18, wherein the adhering of the first and second reflection sheets is performed by using the heat generated while the backlight assembly is aged under a high temperature after the lamp and the light guide plate are received into the receiving container.

20. The method of claim 18, wherein the adhering of the first and second reflection sheets is performed before the lamp and the light guide plate are received into the receiving container.

21. The method of claim of 18, wherein the adhesive comprises a material that does not have adhesivity under a constant temperature and does have adhesivity above a temperature of about 50 Celsius degrees.

22. The method of claim 18, wherein the first and second receiving members comprise a metallic material.

* * * * *